United States Patent

Bernard et al.

[11] 4,102,518
[45] Jul. 25, 1978

[54] AIRCRAFT ARRESTING GEAR

[75] Inventors: Jean-Paul Bernard, Paris; Paul Albert Méningand, Clamart, both of France

[73] Assignee: Aerazur Constructions Aeronautiques, Issy-les-Moulineaux, France

[21] Appl. No.: 835,930

[22] Filed: Sep. 23, 1977

Related U.S. Application Data

[63] Continuation-in-part of Ser. No. 711,662, Aug. 4, 1976, abandoned.

[30] Foreign Application Priority Data

Aug. 6, 1975 [FR] France ................................ 75 24507

[51] Int. Cl.² .............................................. B64F 1/02
[52] U.S. Cl. .............................................. 244/110 C
[58] Field of Search ........... 244/110 R, 114 R, 110 A, 244/110 C, 110 F, 110 G; 43/8, 7; 150/52 R

[56] References Cited

U.S. PATENT DOCUMENTS

| 3,058,703 | 10/1962 | Fonden et al. | 244/110 R |
| 3,622,107 | 11/1971 | Bernard | 244/110 C |

Primary Examiner—Galen L. Barefoot
Attorney, Agent, or Firm—William Anthony Drucker

[57] ABSTRACT

In a gear for arresting aircraft at the ends of a takeoff or landing strip, a net is protected against weather conditions by being folded and enclosed in a bag pressed against the strip tarmac by fixed ropes, a movable rope being provided for normally closing said bag. When this rope is released, the net can move out from the bag, the rope movement being associated with the actuation of the posts supporting the lateral ends of the net disposed across the strip.

5 Claims, 4 Drawing Figures

AIRCRAFT ARRESTING GEAR

This application is a Continuation in part of our co-pending U.S. Application No. 711662 filed 4th August 1976, now abandoned.

BACKGROUND OF THE INVENTION

1. Field of the Invention: This invention relates to means associated with gear of the type used for arresting or braking aircraft at the ends of take-off or landing strips or runways, and comprising essentially a net adapted to be raised by lifting lateral posts pivoted at their base on each side of the strip.

2. Description of the Prior Art: Many known systems consist in storing the net in a groove or narrow trench formed across the strip, but the preferred arrangement consists in most cases in laying the net flat on the strip, for the slot or groove constitutes a relatively expensive solution if it is desired to avoid any impairment of the tarmac quality.

SUMMARY OF THE INVENTION

It is the primary object of the present invention to protect the net against weather conditions without excavating a trench across the strip. For this purpose, the net is enclosed in a bag pressed against the strip surface e.g. by fixed ropes, and closed by a movable retainer so arranged that, when released, this movable retainer will permit the movement of the net out from the bag, the retainer movement being associated with the actuation of the posts supporting the lateral ends of the net disposed across the strip.

DESCRIPTION OF THE PREFERRED EMBODIMENT

Figure 1:
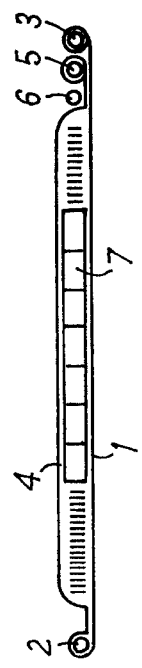
FIG. 1 is a diagrammatic vertical cross section illustrating the bag adapted to house the net of the arresting gear.

The bag according to this invention comprises a bottom wall 1 secured to the strip surface by a pair of fixed ropes or cables 2, 3 spaced along the strip surface and adapted to press the bag against the strip surface, and a top wall 4 at the free edge of which there is a bead 5 which is normally pressed against the strip surface by a movable rope or cable 6. The net proper 7 is folded within the bag 1 - 4.

Figure 2:
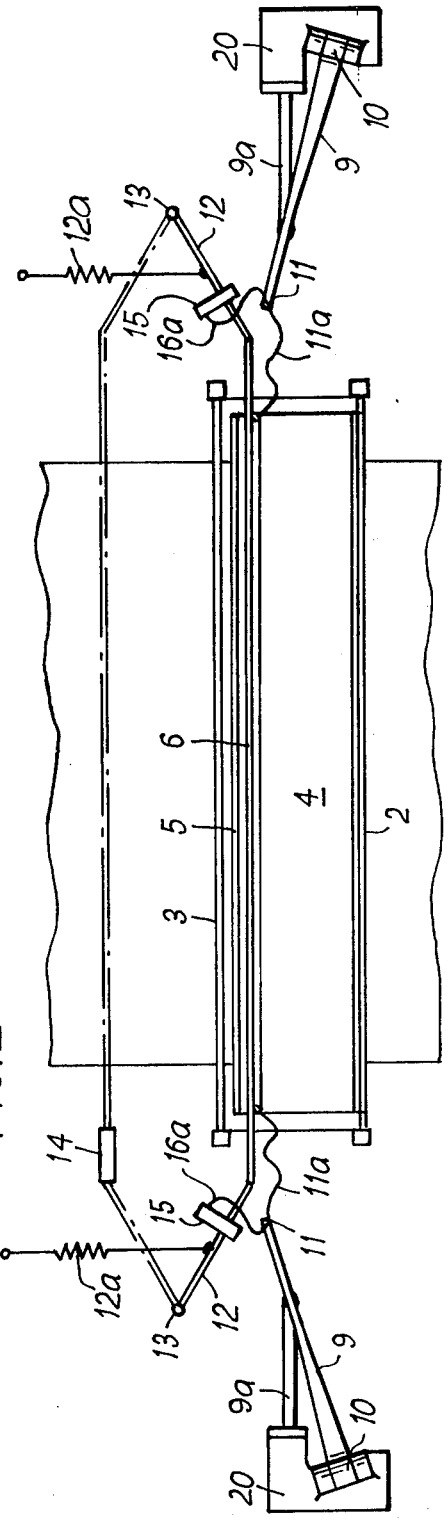
FIG. 2 is a plan view of the arresting gear.

FIG. 2 illustrates the position of the bag across the take-off or landing strip 8. As already known in the art, on each side of the strip, there is mounted a respective post 9 adapted to be lowered and raised, by a shifting mechanism 20 connected to the arm 9 by a link 9a. The mechanism 20 is not shown in detail as it is known in the art and does not form part of the invention. It could be for example, a hydraulic or pneumatic piston and cylinder, or electromagnetic solenoid means. Each post is movable vertically about a hinge mounting 10 provided at the base of each post, the free end 11 of each post being connected by a cord 11a, to the net 7 contained in the bag. The cord 11a is of such a length as to permit a certain amount of initial upward movement of the free end 11 before the cord 11a becomes taut and commences to pull the net upwardly.

The movable rope 6 keeping the bag in its closed condition by pressing on the bag adjacent its bead 5 is moved away, along the strip, during the raising movement of posts 9 by the mechanism of this invention which is operatively connected to the posts 9, this movement of rope 6 clear of the bead 5 of the bag releasing the bag so that the latter can be opened for raising the net contained therein.

Figure 3:
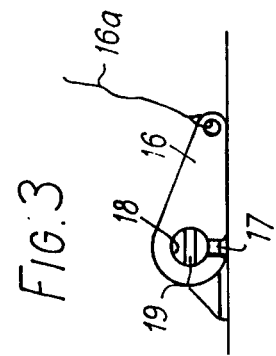
FIG. 3 is a detail view showing a lever for keeping the bag in its closed position.
Figure 4:
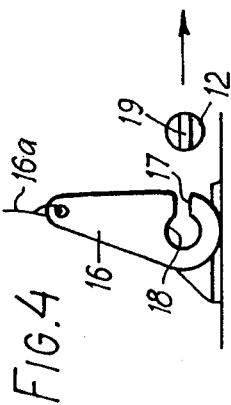
FIG. 4 is a detail view corresponding to FIG. 3 but showing the lever in the position permitting the release and spreading of the arresting gear.

Now reference will be made to FIGS. 2 to 4 showing a typical form of embodiment of the mechanism for releasing the movable rope 6. In this construction, the two ends of rope 6 are attached to a pair of arms 12, respectively, and these arms 12 are pivoted at 13 on each side of the strip 8 for rotation in a horizontal plane; furthermore, the rope 6 is attached to these arms 12 by a screw tightener 14 permitting the proper adjustment of the rope tension.

Each arm 12 is held in the position in which the rope 6 is held on the closed bag by a mechanism 15 comprising a pivoting lever 16 (FIGS. 3 and 4) having a slot 17 opening into a retaining cavity 18 of said lever and engageable by a horizontal flat portion 19 of the free end of said arm 12.

In the retaining position (FIG. 3) the flat portion 19 of the arm 12 engages into the cavity 18 in a direction at right angles to the slot 17, so that it cannot escape through this slot.

The lever 16 is rotated, when raising the posts 9, by a breakable cord 16a connecting the free end 11 of the post 9 to the free end of lever 16. When the lever 16 is raised, as in FIG. 4, its slot 17 becomes coplanar with the flat portion 19 of arm 12 and permits the escape of this portion 19 in the forward direction along the strip, as illustrated by the arrow in FIG. 4, the arm 12 being urged in this direction by a spring 12a mounted on its pivot shaft 13. FIG. 2 shows in chain-dotted lines the position assumed by the arms 12 and rope 6 after their release by raising the posts 9, and it is clearly apparent that the rope 6 has moved in the direction along the strip so as to move clear of the bead 5, so that the bag can be opened to permit the spreading of the arresting net to its operative position.

It will be seen that when the arms 12 have completed their pivotal movement, the rope 6 assumes a position symmetrical, in the horizontal plane, in relation to its intitial position, so that it remains taught across the strip in this new position and flat against the surface of the strip, and the aircraft can clear this rope 6 without any risk of detrimentally hitting same.

It will be readily understood by those conversant with the art that the above-described form of embodiment is given by way of illustration, not of limitation, and that various constructional modifications may be brought thereto, not to mention the use of different means for moving the movable rope, without departing from the basic principles of the invention as set forth in the appended claims.

It is also apparent that the movable rope may be restored to its bag closing position either by simply lowering the posts or preferably by providing independent means therefor.

We claim:

1. For use in association with an aircraft arrester gear, on an airstrip, of the kind including a pair of raisable posts mounted one at each side of the airstrip and an arrester net disposed across the airstrip and connected by a cable to the free end of the raisable posts, the invention which comprises:

i. a bag for positioning on the airstrip to enclose the arrester net in the lowered condition of the net
ii. support means for mounting at each side of the airstrip and having a first position of movement and a second position of movement along the direction of the airstrip
iii. a retainer for positioning across the airstrip and secured to the support means, said retainer in the first position engaging the bag to hold the bag closed, said retainer in the second position being remote from the bag to allow the bag to open
iv. resilient loading means urging the support means to move from first position to the second position,
v. locking means releasably holding the support means in first position
vi. coupling means for connecting the locking means to the raisable posts such that during raising of the posts the locking means is actuated to release the support means for movement from first position to second position.

2. The invention of claim 1, wherein the support means is a pair of arms pivotable in a horizontal plane.

3. The invention of claim 2, wherein the locking means include a catch lever defining a cavity to receive an end of an arm, and a slot opening into the cavity, said lever having a first position in which the slot is not aligned with the horizontal plane of movement of the arms, and a second position in which the slot is aligned with said plane, the actuation of the locking means causing the lever to move from its first position to its second position to release the arm for horizontal pivoting under its resilient loading.

4. The invention of claim 2 wherein the retainer is a cable connected to the free ends of the arms, the arms and the cable assuming symmetrical configurations in the first and second positions of the arms.

5. The invention of claim 1, wherein the coupling means is a breakable cord.

* * * * *